United States Patent
Okamoto (10) Patent No.: US 8,095,068 B2
(45) Date of Patent: Jan. 10, 2012

(54) BROADCAST RECEIVING APPARATUS

(75) Inventor: Kenji Okamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 703 days.

(21) Appl. No.: 12/237,979

(22) Filed: Sep. 25, 2008

(65) Prior Publication Data

US 2009/0081977 A1  Mar. 26, 2009

(30) Foreign Application Priority Data

Sep. 25, 2007 (JP) ................. 2007-247112

(51) Int. Cl.
*H04Q 7/20* (2006.01)
(52) U.S. Cl. ....... 455/25; 455/3.01; 455/3.02; 455/3.03; 455/3.06; 455/575.5; 725/62; 725/63; 725/68; 725/70; 725/72; 343/702; 343/700 R; 343/754; 343/757; 343/766
(58) Field of Classification Search ........ 455/3.01–3.06, 455/25, 422.1, 403, 67.11, 412.1, 412.2, 455/418–420, 550.1, 575.5, 90.1–90.3; 725/62–72; 343/702, 700 R, 754, 757, 766, 777
See application file for complete search history.

(56) References Cited

U.S. PATENT DOCUMENTS

2004/0248517 A1* 12/2004 Reichgott et al. ............ 455/63.4
2006/0020996 A1*  1/2006 Takagi et al. ................. 725/124

FOREIGN PATENT DOCUMENTS

JP  2006-201285  8/2006

* cited by examiner

*Primary Examiner* — Keith Ferguson
(74) *Attorney, Agent, or Firm* — Morgan, Lewis & Bockius LLP (57) ABSTRACT

When an RF signal is output, noise is prevented from appearing in the RF signal without degrading convenience. The MPU of the set top box has a functionally of an RF determination portion, which determines whether or not the RF signal is being output, the antenna setting portion, which if it is determined by the RF determination portion that the output of the RF signal is started, sets a smart antenna to preset one direction of a first predetermined number of directions and to preset one gain of a second predetermined number of steps of gains, and a change prohibition portion which prohibits a change of a direction and gain of the smart antenna if it is determined by the RF determination portion that the RF signal is being output.

10 Claims, 5 Drawing Sheets

BROADCAST RECEIVING APPARATUS

This application is based on Japanese Patent Application No. 2007-247112 filed on Sep. 25, 2007, the contents of which are hereby incorporated by reference.

BACKGROUND OF THE INVENTION

1. Field of the Invention

The present invention relates to a broadcast receiving apparatus to which a smart antenna so structured as to change its directivity direction in the predetermined number of directions and to change its gain in the predetermined number of steps is connected and which receives a television broadcast via the connected antenna and outputs a radio frequency (RF) signal.

2. Description of the Related Art

Conventionally, to receive television broadcasts, directional antennas such as a Yagi antenna and the like have been used. Such directional antennas can receive a weak electric wave because of their high directivity, while they have a disadvantage that they can receive an electric wave from only a given direction. These characteristics do not become a problem so often in Japan or the like where transmission towers which transmit television broadcast waves are concentrated in an area. However, in the USA or the like, there are many districts where a plurality of transmission towers are distributed surrounding an urban area, and when a directional antenna was used, some stations were not able to receive broadcast waves even if there was a short distance from the transmission tower.

Accordingly, to solve these problems, the EIA (Electronic Industries Alliance)—909 (Antenna Control Interface) standard which controls an antenna from a receiving apparatus was made to make it possible to change an antenna's directivity. This is the standard to connect an antenna (hereinafter, called a smart antenna) whose directivity can be changed to a receiving apparatus and to control the antenna from the receiving apparatus side via a modular terminal.

For these television broadcast receiving apparatuses to which a smart antenna can be connected, it is necessary to set the direction (hereinafter, called the optimum receiving direction) of a smart antenna where television broadcast signals can be received in the best condition, and various apparatuses and methods have been proposed to set the optimum receiving direction.

For example, disclosed is a television (TV) broadcast receiving apparatus (patent document 1) which outputs receiving direction control signals to indicate all receiving directions to a connected antenna in succession, measures the receiving intensity of a television broad cast signal received after each receiving direction is indicated, and determines whether or not the connected antenna is a smart antenna based on the measured receiving intensity. According to such a TV broadcast receiving apparatus, it is possible to determine whether or not a connected antenna is a smart antenna, and to carry out an appropriate receiving control according to a determination result, that is, a smart antenna or not.

[patent document 1]JP-A-2006-201285

However, in the TV broadcast receiving apparatus described above, when a television broadcast is received via a connected smart antenna and a RF signal is output, the receiving direction of the smart antenna is changed whenever the channel is changed, and therefore, noise could appear in the output RF signal. Besides, when a television broadcast is received via a connected smart antenna and a RF signal is output, if the receiving direction of the smart antenna is not changed to prevent noise from appearing in the output RF signal, there is a problem that the number of ready-to-receive channels decreases.

SUMMARY OF THE INVENTION

The present invention has been made to cope with the conventional problems, and it is an object of the present invention to provide a broadcast receiving apparatus which when a RF signal is output, can prevent noise from appearing in the RF signal without degrading convenience.

To achieve the above-described object, a broadcast receiving apparatus described in claim 1 is a broadcast receiving apparatus to which a smart antenna so structured as to be capable of changing its directivity direction in the first predetermined number of directions and changing its gain in the second predetermined number of steps is connected, and which can receive a television broadcast via the connected smart antenna and output a RE (radio frequency) signal, the broadcast receiving apparatus comprises: channel setting means which receives an operation input from outside and selects one channel for reception from a plurality of predetermined channels based on the received operation input and sets it; receiving, means which receives a television broadcast corresponding to the channel set by the channel setting means; RF determination means for determining whether or not the RF signal is being output; antenna setting means which when the RF determination means determines that the output of the RF signal is about to be started, sets the smart antenna to one preset direction of the first predetermined number of directions and sets the smart antenna to one preset gain of the second predetermined number of steps of gains; and change prohibition means which when the RF determination means determines that the RF signal is being output, prohibits the change of the direction and gain of the smart antenna even if a channel is set by the channel setting means.

According to a broadcast receiving apparatus described in claim 1, an operation input from outside is received, and one channel for reception is selected from a plurality of predetermined channels based on the received operation input and is set, and a television broadcast is received corresponding to the set channel. It is determined whether or not a RF signal is being output, and if it is determined that the output of a RF signal is started, a smart antenna is set to one direction which is selected from the first predetermined number of directions and is set, and is also set to one gain which is selected from the second predetermined number of steps of gains and is set. If it is determined that a RF signal is being output, the change of the direction and gain of the smart antenna is prohibited even if a channel is set. Accordingly, when a RF signal is output, it is possible to prevent noise from appearing in the RF signal without degrading convenience.

As described above, when a RF signal is being output, the change of the direction and gain of a smart antenna is prohibited even if a channel is set, therefore noise, which appears when the direction and gain of a smart antenna are changed, can be surely prevented from appearing in the RF signal. Accordingly, when a RF signal is output, it is possible to prevent noise from appearing in the RF, signal.

Besides, if it is determined that a RF signal is started, because a smart antenna is set to one preset direction of the first predetermined number of directions, and to one preset gain of the second predetermined number of steps of gains, users can receive a broadcast from a channel which they desire to watch by setting one appropriate direction and one appropriate gain in advance, and it is possible to prevent noise from appearing in the RF signal without degrading convenience.

DETAILED DESCRIPTION OF THE PREFERRED EMBODIMENTS

Figure 1:
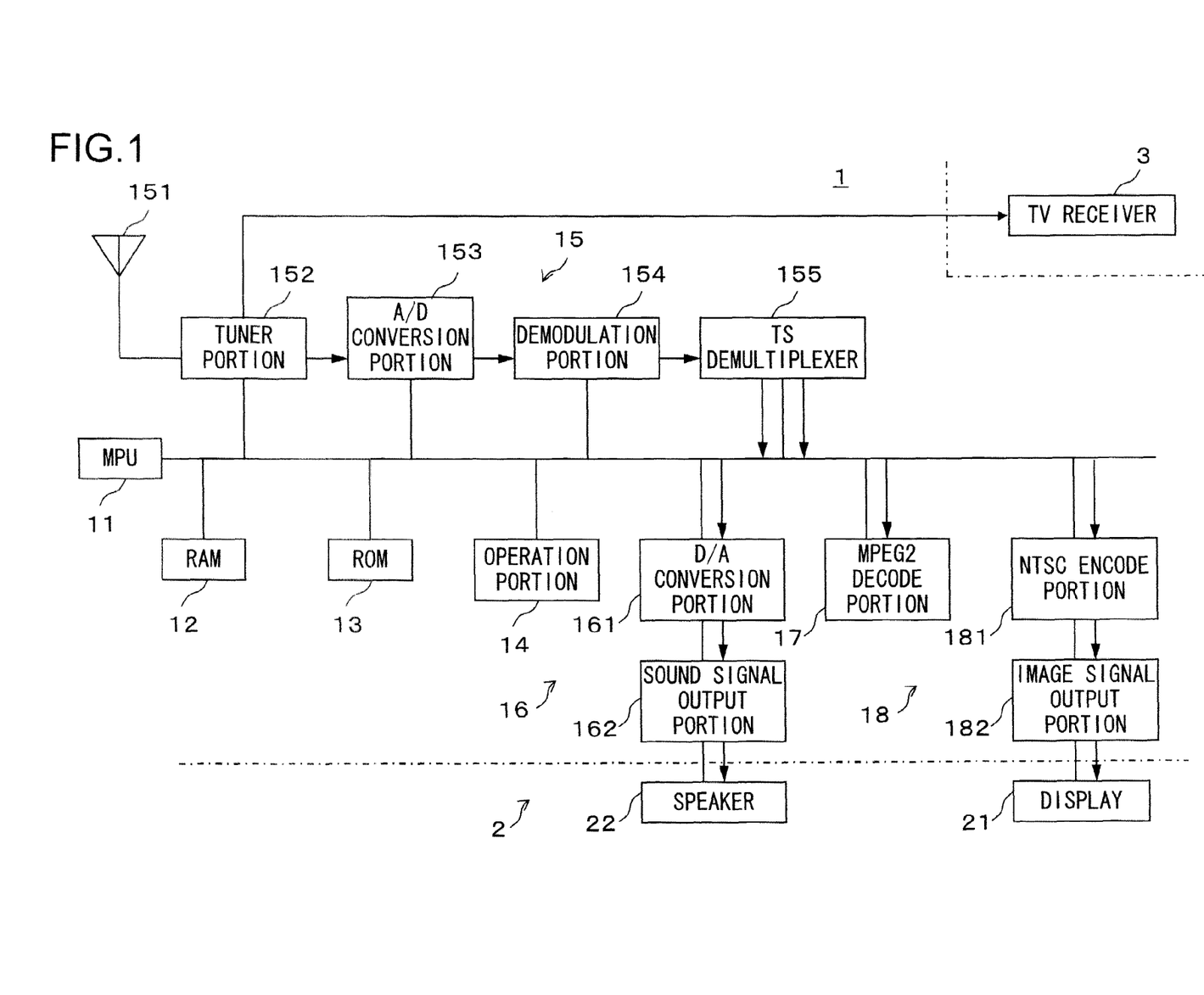
FIG. 1 is a block diagram showing a configuration example of a set top box according to the present invention.

Infra, an embodiment of the present invention is explained referring to the drawings. FIG. 1 is a block diagram showing a configuration example of a set top box according to the present invention. A set top box (STB) 1 (which corresponds to a broadcast receiving apparatus) receives a television broadcast and outputs it to an output apparatus 2 and to a TV receiver 3, and comprises a MPU 11, a RAM 12, a ROM 13, an operation portion 14, a receiving portion 15, a sound output portion 16, a MPEG2 decode portion 17, and an image output portion 18.

The output apparatus 2 includes a display 21 and a speaker 22, outputs a sound corresponding to a sound signal from the set top box 1, and outputs an image corresponding to an image signal from the set top box 1. The display 21 includes a LCD (liquid crystal display), a PDP (plasma display panel) and the like, and displays an image corresponding to an image signal from the set top box 1 (an image signal output portion 182 explained later). The speaker 22 outputs a sound corresponding to a sound signal output from the set top box 1 (a sound signal output portion 162 explained later). The TV receiver 3 receives a RF (radio frequency) signal from the set top box 1 and outputs a sound and an image corresponding to the received RF signal.

The MPU (Micro Processing Unit) 11 controls over the entire set top box 1. The RAM (random access memory) 12 stores information to be read and written such as sound information, image information and the like. The ROM (read only memory) 13 stores the control program and the like to operate the MPU 11.

The operation portion 14 receives various operations such as on-off operation of a power supply, channel selection and the like. The receiving portion 15 (which corresponds to receiving means) receives a television broadcast and demodulates it, and includes an antenna portion 151, a tuner portion 152, an A/D conversion portion 153, a demodulation portion 154, and a TS demultiplexer 155.

The antenna portion 151 includes a smart antenna which can change directivity and gain conforming to the EIA-909 standard, and receives a television broadcast. The tuner portion 152 selects a preset-channel television broadcast from among television broadcast waves received by the antenna portion 151. The A/D conversion portion 153 converts an output signal (analog signal) from the tuner 152 into digital information. The demodulation portion 154 demodulates output information from the A/D conversion portion 153. The TS (transport stream) demultiplexer 155 separates output information demodulated by the demodulation portion 154 corresponding to each kind of information (image information, sound information, control information etc.) and outputs them.

The sound output portion 16 outputs a sound corresponding to a television broadcast received by the receiving portion 15, and has a D/A conversion portion 161 and a sound signal output portion 162. The D/A conversion portion 161 converts sound information (digital information) output from the TS demultiplexer 155 into an analog signal. The sound signal output portion 162 outputs a sound signal, which is already converted into an analog signal by the D/A conversion portion 161, to the speaker 22 of the output apparatus 2.

The MPEG (Motion Picture Experts Group)2 decode portion 17 decodes image information output from the TS demultiplexer 155 into image information before compression.

The image output portion 18 outputs image information decoded by the MPEG2 decode portion 17, and has a NTSC encode portion 181 and an image signal output portion 182. The NTSC (National Television Standard Committee) encode portion 181 converts image information decoded by the MPEG2 decode portion 17 into an image signal of the NTSC system. The image signal output portion 182 outputs an image signal of the NTSC system output from the NTSC encode portion 181 to the display 21 of the output apparatus 2.

Next, an operation of the set top box 1 during the time when it receives a broadcast is explained. First, a transmitted digital television broadcast wave is received by the antenna portion 151. If an channel selection operation is received via the operation portion 14, the transponder change-over is carried out for the broadcast reception by the tuner portion 152. A received digital broadcast wave is converted into digital information by the A/D conversion portion 153 and demodulated by the demodulation portion 154.

A digital broadcast wave is transmitted from a transmitting side (transmitting station) as a TS (transport stream) packet. This TS packet includes image information, sound information, control signal etc. and these information is separated and output by the TS demultiplexer 155, and stored into the RAM 12. Sound information read out from the RAM 12 is converted into an analog signal by the D/A conversion portion 161 and the sound is output from the speaker 22 of the output apparatus 2 via the sound signal output portion 162.

Image information read out from the RAM 12 is decoded into image information by the MPEG2 decode portion 17 before compression, converted into a television signal of the NTSC system by the NTSC encode portion 181, and displayed on the display 21 of the output apparatus 2 via the image signal output portion 182.

Figure 2:
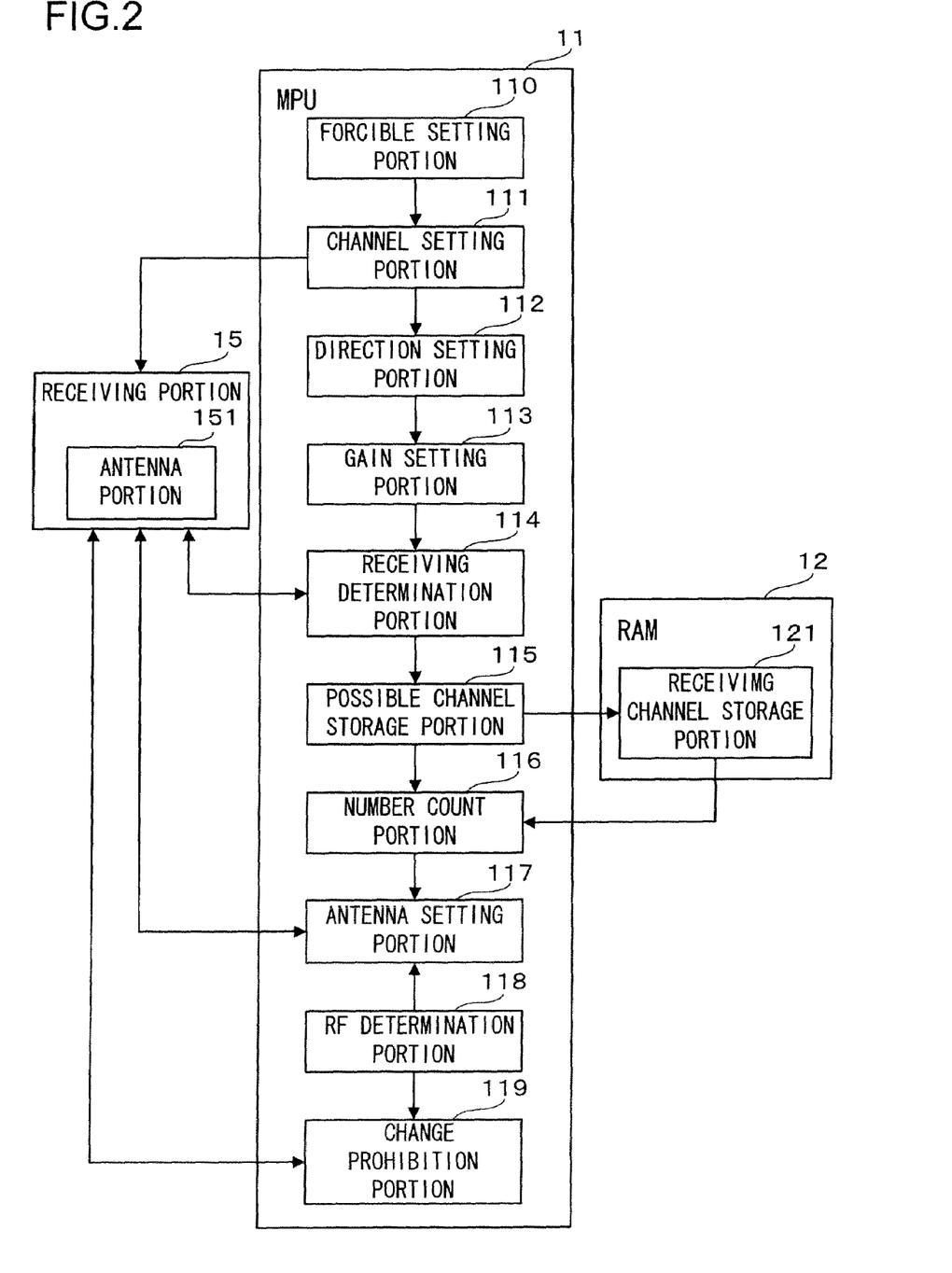
FIG. 2 is a block diagram showing a configuration example of the main portion of a set top box according to the present invention.

FIG. 2 is a block diagram showing a configuration example of the main portion of the set top box 1 according to the present invention. The MPU 11 of the set top box 1 shown in FIG. 1 has functionally a forcible setting portion 110, a channel setting portion 111, a direction setting portion 112, a gain setting portion 113, and a receiving determination portion 114, a possible channel record portion 115, a number count portion 116, an antenna setting portion 117, a RF determination portion 118, and a change prohibition portion 119, and the RAM 12 has functionally a receiving channel storage portion 121.

The MPU 11 reads out the control program which is stored in the ROM 13 and the like in advance, executes it, and functions as the functional potions such as the forcible setting portion 100, the channel setting portion 111, the direction setting portion 112, the gain setting portion 113, the receiving determination portion 114, the possible channel storage portion 115, the number count portion 116, the antenna setting portion 117, the RF determination portion 118, the change prohibition portion 119 and the like, and makes the RAM 12 function as the functional portion such as the receiving channel storage portion and the like.

Of various data stored in the RAM 12 and the ROM 13 shown in FIG. 1, data which can be stored in a removable recording medium may be read out by drivers for data reading apparatuses such as a hard disc drive, an optical disc drive, a flexible disc drive, a silicon disc dive, a cassette medium reader etc. In this case, recording media are, for example, a hard disc, an optical disc, a flexible disc, a CD (compact disc), a DVD (digital versatile disc), a semiconductor memory etc.

The receiving channel storage portion 121 (which corresponds to receiving channel storage means) stores channel identification information (here, channel number information) which identifies ready-to-receive channels corresponding to each one of the first predetermined number (here, 16) of directions and to each one of the second predetermined number (here, 4) steps of gains. The channel identification information stored in the receiving channel storage portion 121 is recorded (written) by the possible channel record portion 115 and read out by the number count portion 116.

The forcible setting portion 110 (which corresponds to forcible setting means) makes the channel setting portion 111 select one channel from a plurality of channels (e.g., 68 channels of the channel numbers 2 to 69) and set it in succession.

The channel setting portion 111 (which corresponds to channel setting means) receives an operation input from a user via the operation portion 14 or the like and based on the received operation input, selects one channel for broadcast reception from a plurality of predetermined channels (here, 68 channels of the channel numbers 2 to 69) and sets it. Besides, the channel setting portion 111 follows an instruction from the forcible setting potion 110 to select one channel for broadcast reception from a plurality of channels (here, 68 channels) and to set it.

The direction setting portion 112 (which corresponds to direction setting means) selects one direction from the first predetermined number (here, 16) of directions and sets it in a predetermined order whenever one channel is set by the forcible setting portion 110 via the channel setting portion 111.

The gain setting portion 113 (which corresponds to gain setting means) selects one gain from the second predetermined number (here, 4) of steps of gains and sets it in a predetermined order whenever one direction is set by the direction setting portion 112.

Figure 3A:
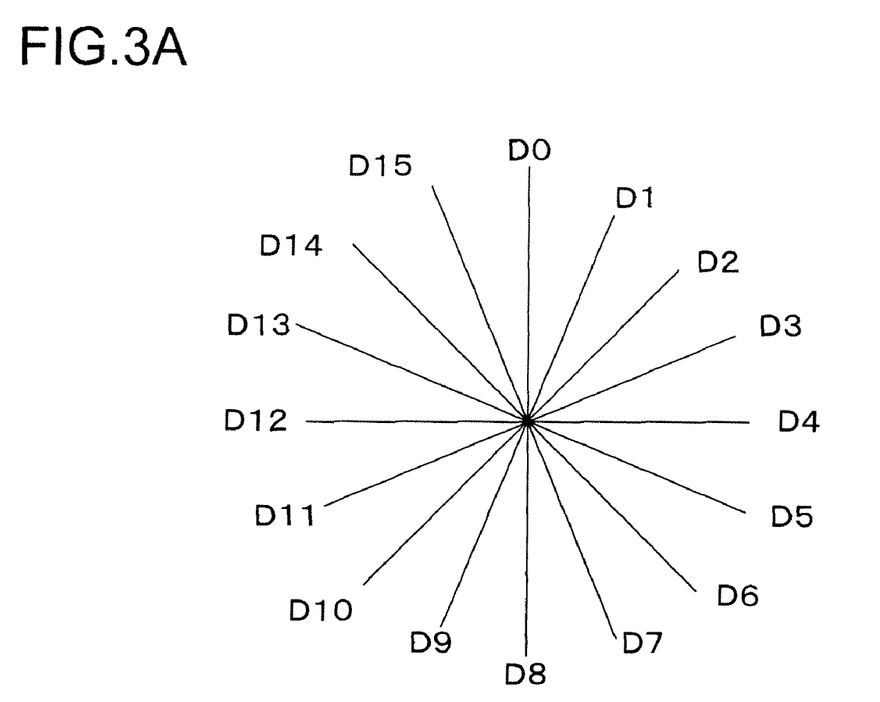
FIG. 3 is a view showing directions and gains which can be set for a smart antenna.
Figure 3B:
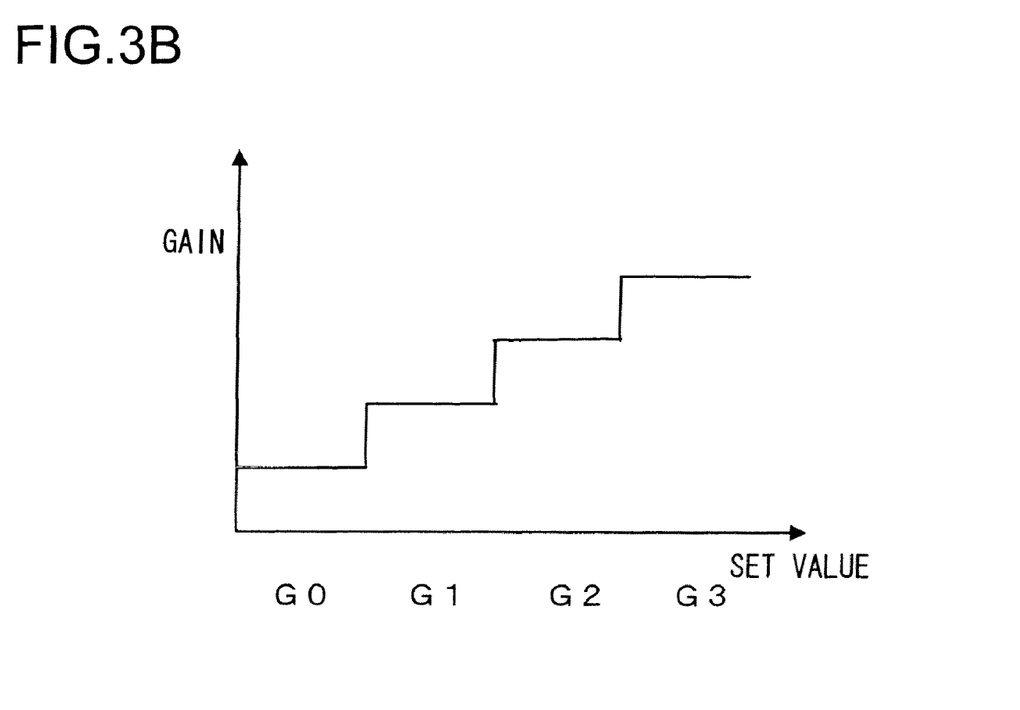

FIG. 3 is a view showing an example of directions and gains of a smart antenna which are able to be set. FIG. 3(a) is a view showing an example of directions of a smart antenna which are able to be set by the direction setting portion 112. FIG. 3(b) is a view showing an example of gains of a smart antenna which are able to be set by the gain setting portion 113. As shown in FIG. 3(a), a smart antenna connected to the antennal portion 151 is set to any one of the 16 directions D0 to D15 having an angle of 22.5° therebetween. The direction setting portion 112 sets one direction in the order of, for example, the direction D0, direction D1, direction D2, . . . , and direction D15.

As sown in FIG. 3(b), a smart antenna connected to the antenna portion 151 is set to any one of the gains G0 to G3. Here, the gain values become large in the order of G0 to G3. The gain setting portion 113 sets one gain in the order of, for example, the gain G0, gain G1, gain G2, and gain G3.

Whenever one gain is set by the gain setting portion 113, the receiving determination portion 114 (which corresponds to receiving determination means) sets a smart antenna to one direction set by the direction setting portion 112, sets it to one gain set by the gain setting portion 113, and determines whether or not a television broadcast received via the receiving portion 15 can be received. Specifically, the receiving determination portion 114 determines if a television broadcast can be received or not based on a BER (bit error rate) of a television broadcast signal received via the receiving portion 15. For example, when a BER is equal to or smaller than $10^{-7}$, the receiving determination portion 114 determines that a broadcast reception is possible.

When a broadcast reception is determined possible by the receiving determination portion 114, the possible channel record portion 115 (which corresponds to possible channel record means) records (writes) the identification information (here, channel number information) on one channel set by the channel setting portion 111 relating the information to one gain set by the gain setting portion 113 and to one direction set by the direction setting portion 112.

The number count portion 116 (which corresponds to number count means) obtains the number ACH of ready-to-receive channels of a plurality of channels (here, 68) for each one of the first predetermined number (here, 16) of directions and for each one of the second predetermined number (here, 4) of steps of gains.

Specifically, when the receiving determination portion 114 ends all of the determinations on a possible broadcast reception for all of a plurality of channels (here, 68), the number count portion 116 counts, for each one of the first predetermined number (here, 16) of directions and for each one of the second predetermined number (here, 4) of steps of gains, the number of ready-to-receive channels given by the channel identification information (here, channel number information) stored in the receiving channel storage portion 121.

If it is determined by the RF determination portion 118 that the output of a RF signal is started, the antenna setting portion 117 (which corresponds to antenna setting means) sets a smart antenna to preset one direction of the first predetermined number (here, 16) of directions and to preset one gain of the second predetermined number (here, 4) of steps of gains.

Specifically, based on the number of ready-to-receive channels obtained by the number count portion 116, the antenna setting portion 117 sets one direction and one gain to a smart antenna. For example, the antenna setting portion 117 sets a smart antenna to the direction and gain for which the number ACH of read-to-receive channels is the largest of the number of ready-to-receive channels obtained by the number count portion 116.

The RF determination portion 118 (which corresponds to RF determination means) determines whether o not a RF signal is being output to the TV receiver 3.

If it is determined by the RF determination portion 118 that a RF signal is being output to the TV receiver 3, the change prohibition portion 119 (which corresponds to change prohibition means) prohibits the change of the direction and gain of a smart antenna even if a channel is set by the channel setting portion 111. In other words, if it is determined by the RF determination portion 118 that a RF signal is being output to the TV receiver 3, the change prohibition portion 119 continues to set a smart antenna to the one direction and one gain set by the antenna setting portion 117.

Figure 4:
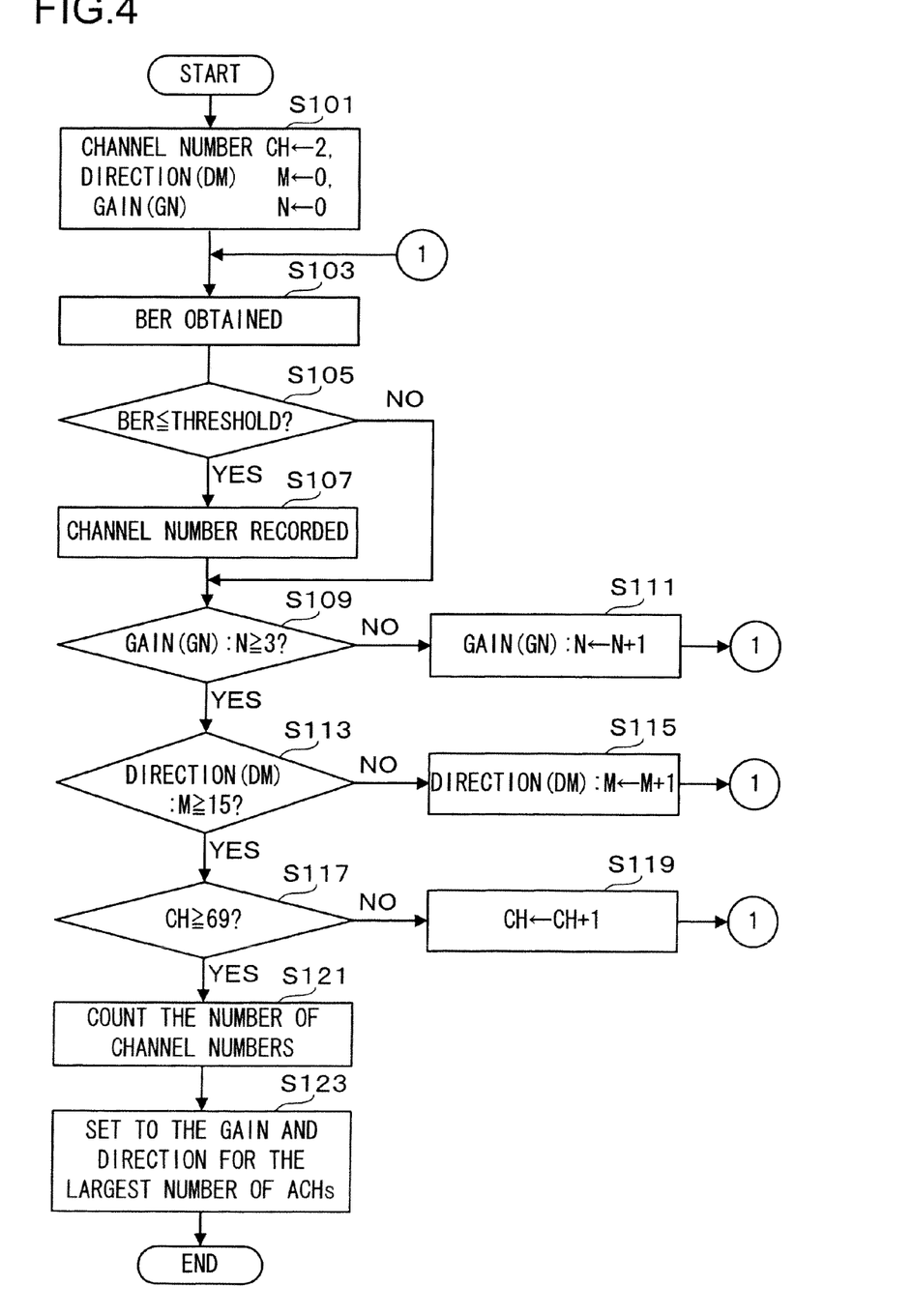
FIG. 4 is a flowchart showing an operation example where a direction and a gain to be set to a smart antenna are obtained by a set top box (chiefly MPU).

FIG. 4 is a flowchart showing an operation example where a direction and a gain are obtained to be set to a smart antenna by the set top box 1 (chiefly the MPU 111). First, a channel number CH is set to 2 by the forcible setting portion 110 via the channel setting portion 111, a parameter M which shows a direction (DM) of a smart antenna is set to 0 (set to the direction D0) by the direction setting portion 112, and a parameter N which shows a gain (GN) of a smart antenna is set to 0 (set to the gain G0) by the gain setting portion 113 (S101).

Next, a BER of a television broadcast received via the receiving portion 15 is obtained by the receiving determination portion 114 (S103). Then, it is determined by the receiving determination portion 114 whether or not the BER obtained in the step S103 is equal to or smaller than the threshold (e.g., $10^{-7}$) (a broadcast reception is determined possible or not) (S105). If it is determined that the BER is not equal to nor smaller than the threshold (a broadcast reception is impossible) (NO in S105), the processing goes to the step S109. If the BER is determined equal to or smaller than the threshold (a broadcast reception is possible) (YES in S105), the possible channel record portion 115 records the channel number information of the set one channel into the receiving channel storage potion 121 relating the information to the set one direction and one gain of a smart antenna (S107).

If it is determined NO in the step S105 or the processing in the step S107 is ended, it is determined by the gain setting portion 113 whether or not the parameter N which shows a gain (GN) of a smart antenna is equal to or larger than 3 (S109). If it is determined that the parameter N is not equal to nor larger than 3 (NO in S109), the parameter N is increased 1 by the gain setting potion 113, the processing is returned to the step S103, and the step S103 and the following steps are repeatedly executed.

If the parameter N is determined equal to or larger than 3 (YES in S109), it is determined by the direction setting portion 112 whether or not the parameter M which shows a direction (DM) of a smart antenna is equal to or larger than 15 (S113). If it is determined that the parameter M is not equal to nor larger than 15 (NO in S113), the parameter M is increased 1 by the direction setting portion 112 (S111), the processing is returned to the step S103, and the step S103 and the following steps are repeatedly executed.

If the parameter M is determined equal to or larger than 15 (YES in S113), it is determined by the forcible setting portion 110 via the channel setting portion 111 whether or not the channel number CH is equal to or larger than 69 (S127). If it is determined that the channel number CH is not equal to nor larger than 69 (NO in S117), the channel number CH is increased 1 by the forcible setting portion 110 via the channel setting portion 111 (S119), the processing is returned to the step S103, and the step S103 and the following steps are repeatedly executed.

If the channel number CH is determined equal to or larger than 69 (YES in S117), the number ACH of ready-to-receive channels is obtained by the number count portion 116 for each one of the first predetermined number (here, 16) directions and for each one of second predetermined number (here, 4) of steps of gains (S121). Then, one direction and one gain of a smart antenna which are set when a RF signal is being output are decided by the antenna setting portion 117 on the direction and gain for which the number ACH of ready-to-receive channels is the largest of the number of ready-to-receive channels obtained in the step S121 (S123), and the processing is ended.

Figure 5:
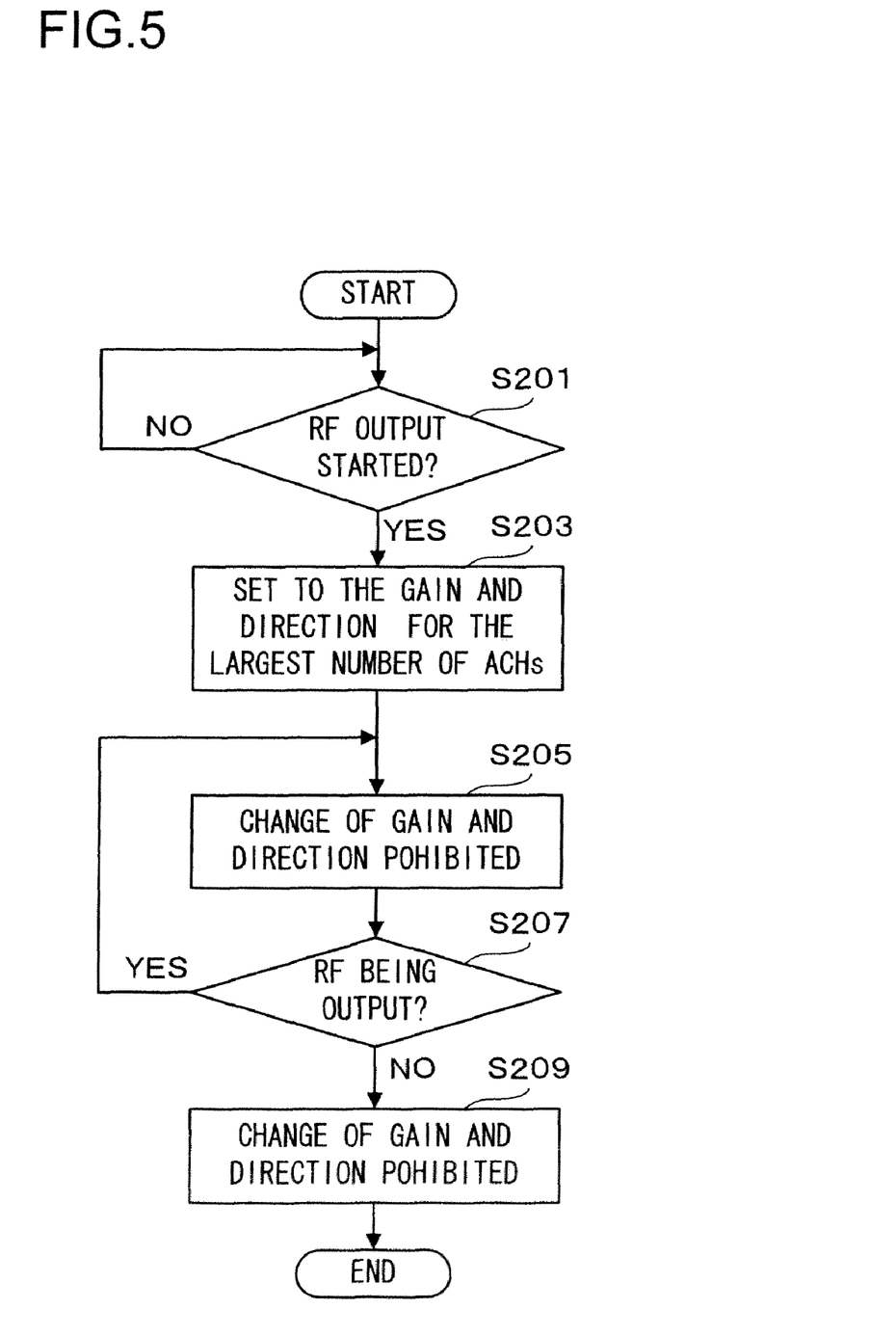
FIG. 5 is a flowchart showing an operation example where a direction and a gain are set to a smart antenna by a set top box (chiefly MPU).

FIG. 5 is a flowchart showing an operation example where a direction and a gain are set to a smart antenna by the set top box 1 (chiefly the MPU 11). First, it is determined by the RF determination portion 118 whether or not the output of a RF signal to the TV receiver 3 has been started (S201). If it is determined that the output of a RF signal has not been started yet (NO in S201), the processing goes into a waiting state.

If it is determined that the output of a RF signal has been started (YES in S201), the smart antenna is set to the direction and gain for which the number ACH of ready-to-receive channels is the largest (S203). Then, the change of the direction and gain of the smart antenna is prohibited by the change prohibition portion 119 (S205).

Next, it is determined by the RF determination portion 118 whether or not a RF signal is being output to the TV receiver 3 (S207). If it is determined that a RF signal is being output (YES in S207), the processing is returned to the step S205, and the step S205 and the following steps are repeatedly executed. If it is determined that a RF signal is not being output (the output of a RF signal is completed) (NO in S207), the prohibition on the change of the direction and gain of the antenna is released by the change prohibition portion 119 (S209), and the processing is ended.

In this way, it is determined whether or not a RF signal is being output, and if it is determined that the output of a RF signal is started, a smart antenna is set to one preset direction of the first predetermined number (here, 16) of directions and to one preset gain of the second predetermined number (here, 4) of steps of gains. Besides, if it is determined that a RF signal is being output, the change of the direction and gain of a smart antenna is prohibited even if a channel is set. Accordingly, when a RF signal is output, it is possible to prevent noise from appearing in the RF signal without degrading convenience.

As described above, if it is determined that a RF signal is being output, the change of the direction and gain of a smart antenna is prohibited even if a channel is set, therefore it is possible to prevent noise, which appears when the direction and gain of a smart antenna are changed, from appearing in a RF signal. Accordingly, when a RF signal is output, it is possible to prevent noise from appearing in the RF signal.

Besides, if it is determined that the output of a RF signal is started, a smart antenna is set to one preset direction of the first predetermined number (here, 16) of directions and to one preset gain of the second predetermined number (here, 4) of steps of gains. Therefore, because a channel which a user desires to watch can be received by setting a smart antenna to one appropriate direction and one appropriate gain in advance, it is possible to prevent noise from appearing in the RF signal without degrading convenience.

Further, because the number of ready-to-receive channels of a plurality of channels (here, 68) is obtained for each one of the first predetermined number (here, 16) of directions and for each one of the second predetermined number (here, 4) of steps of gains, and because one direction and one gain are set to a smart antenna based on the obtained number ACH of ready-to-receive channels, it is possible to further prevent noise from appearing in the RF signal without degrading convenience.

In other words, for example, a user can watch broadcasts corresponding to more than the predetermined number of channels by setting one direction and one gain, for which the number of ready-to-receive channels is equal to or larger than the predetermined number (e.g., 10) of ready-to-receive channels, to a smart antenna. Accordingly it is possible to further prevent noise from appearing in the RF signal without degrading convenience.

In addition, because a smart antenna is set to the one direction and one gain for which the number of ready-to-receive channels is the largest, it is possible to further prevent noise from appearing in the RF signal without degrading convenience.

In other words, because a smart antenna is set to the one direction and one gain for which the number of ready-to-receive channels is the largest, a user can watch broadcasts corresponding to the largest number of channels, and it is possible to further prevent noise from appearing in the RF signal without degrading convenience.

In addition, the channel identification information (here, channel number information) which is the information to identify the channels that are ready to receive a broadcast is stored into the receiving channel storage portion 121 being related to each one of the first predetermined number (here, 16) of directions and to each one of the second predetermined number (here, 4) of steps of gains. One channel is selected from a plurality of channels (here, 68) and is set in succession and one direction is selected from the first predetermined number of directions and set in a predetermined order whenever one channel is set, and one gain is selected from the second predetermined number of steps of gains and is set in a predetermined order whenever one direction is set. Then, whenever one gain is set, a smart antenna is set to the set one direction and to the set one gain, and it is determined whether or not a television broadcast received via the receiving portion 15 can be received. If it is determined that a television broadcast can be received, the channel identification information on the set one channel is stored into the receiving channel storage portion 121 being related to the set one gain and direction. If all the determinations on a possible broadcast reception for all the plurality of channels are ended, all the numbers ACHs of ready-to-receive channels given by the channel identification information stored in the receiving channel storage portion 121 are counted for each one of the first predetermined number of directions and for each one the second predetermined number of steps of gains. Accordingly, the number of ready-to-receive channels can be exactly counted for each one of the first predetermined number of directions and for each one of the second predetermined number of steps of gains.

Furthermore, because it is determined if a broadcast reception is possible or not based on a BER of a television broadcast signal received via the receiving portion 15, it is possible to exactly determine with a simple approach whether or not a broadcast can be received.

The present invention can also be applied to the following cases:

(A) In the present embodiment, the case where the broadcast receiving apparatus is the set top box 1 which receives a digital broadcast is descried. However, a broadcast receiving apparatus which receives an analog broadcast may be used as a broadcast receiving machine such as the set top box 1 and the like, or a broadcast receiving apparatus which receives both analog and digital broadcasts may be used as a broadcast receiving machine such as the set top box 1 and the like. When the set top box 1 receives an analog broadcast, it may be determined using S/N ratios instead of BERs whether or not a broadcast reception is possible.

(B) In the present embodiment, explained is the case where the set top box 1 outputs sound and image signals to the output apparatus 2 and outputs RF signals to the TV receiver 3. However, the set to box 1 may output sound signals, image signals and RF signals to the TV receiver 3.

(C) In the present embodiment, explained is the case where the direction setting portion 112 sets one direction in a predetermined order whenever one channel is set, the gain setting portion 113 sets one gain in a predetermined order whenever one direction is set, and the receiving determination portion 114 determines whether or not a broadcast reception is possible whenever one gain is set by the gain setting portion 113. However, it may be a case where the gain setting portion 113 sets one gain in a predetermined order whenever one channel is set, the direction setting portion 112 sets one direction in a predetermined order whenever one gain is set, and the receiving determination portion 114 determines whether or not a broadcast reception is possible whenever one direction is set by the direction setting portion 112. In this case, the number of gain settings can be reduced.

(D) In the present embodiment, explained is the case where during the time when a RF signal is being output, the antenna setting portion 117 sets a smart antenna to the direction and gain for which the number ACH of ready-to-receive channels is the largest. However, the antenna setting portion 117 may set a smart antenna to the direction and gain for which the predetermined number of channels can be received. In this case, a user can surely watch a channel which the user desires to by setting the smart antenna to a direction and gain which allows the channel reception which the user desires to watch.

(E) In the present embodiment, explained is the case where during the time when a RF signal is being output, the antenna setting portion 117 sets a smart antenna to the direction and gain for which the number ACH of ready-to-receive channels is the largest. However, during the time when a RF signal is being output, the antenna setting portion 117 may set the smart antenna to a direction and gain which the user desires and are selected from the directions and gains for which the number ACH of ready-to-receive channels is equal to or larger than the predetermined number (e.g., 10) of thresholds. In this case, the user can surely watch many channels which the user desires to.

What is claimed is:

1. A broadcast receiving apparatus to which a smart antenna so structure as to be capable of changing its directivity direction in a first predetermined number of directions and changing its gain in a predetermined number of steps is connected and which receives a television broadcast via the connected antenna and outputs an RF (radio frequency) signal, the broadcast receiving apparatus comprising:

channel setting means which receives an operation input from outside and selects one channel for reception from a plurality of predetermined channels based on the received operation input and sets the selected channel;

receiving means for receiving the television broadcast corresponding to the channel set by the channel setting means;

RF determination means for determining whether or not the RF signal is being output;

antenna setting means, which when the RF determination means determines that the output of the RF signal is started, sets the smart antenna to one preset direction of the first predetermined number of directions and sets the smart antenna to one preset gain of the second predetermined number of steps of gains; and change prohibition means which when the RF determination means determines that the RF signal is being output, prohibits the change of the direction and gain of the smart antenna even if a channel is set by the channel setting means; and number count means for obtaining a number of ready-to-receive channels of a plurality of channels for each one of the first predetermined number of directions and for each one of the second predetermined number of steps of gains, wherein the antenna setting means sets the one direction and one gain to the smart antenna based on the number of ready-to-receive channels obtained by the number count means.

2. The broadcast receiving apparatus according to claim 1, wherein
the antenna setting means sets the smart antenna to the direction and gain for which the number of read-to-receive channels is the largest of the number of ready-to-receive channels obtained by the number count means.

3. The broadcast receiving apparatus according to claim 2, further comprising:
receiving channel storage means for storing channel identification information which identifies ready-to-receive channels relating the channel identification information to each one of the first predetermined number of directions and to each one of the second predetermined number steps of gains;
forcible setting means which makes the channel setting means select one channel from the plurality of channels and set it in succession;
direction setting means which selects one direction from the first predetermined number of directions and sets it in a predetermined order whenever one channel is set by the forcible setting means via the channel setting means;
gain setting means which selects one gain from the second predetermined number of steps of gains and sets it in a predetermined order whenever one direction is set by the direction setting means;
receiving determination means which whenever one gain is set by the gain setting means, sets a smart antenna to one direction set by the direction setting means, sets the smart antenna to one gain set by the gain setting means, and determines if the television broadcast received by the receiving means can be received; and
possible channel record means which when a television broadcast reception is determined possible by the receiving determination means, records the identification information on one channel set by the channel setting means relating the identification information to one gain set by the gain setting means and to one direction set by the direction setting means,
wherein the number count means counts, for each one of the first predetermined number of directions and for each one of the second predetermined number of steps of gains, the number of ready-to-receive channels given by the channel identification information stored in the receiving channel storage means when the receiving determination means ends all of the determinations on a possible television broadcast reception for all of the plurality of channels.

4. The broadcast receiving apparatus according to claim 3, wherein
the receiving determination means determines whether or not the television broadcast reception is possible based on a BER (bit error rate) of a television broadcast signal received via the receiving means.

5. The broadcast receiving apparatus according to claim 2, further comprising:
receiving channel storage means for storing channel identification information which identifies ready-to-receive channels relating the channel identification information to each one of the first predetermined number of directions and to each one of the second predetermined number steps of gains;
forcible setting means which makes the channel setting means select one channel from the plurality of channels and set it in succession;
gain setting means which selects one direction from the second predetermined number of gains and sets it in a predetermined order whenever one channel is set by the forcible setting means via the channel setting means;
direction setting means which selects one direction from the first predetermined number of directions and sets it in a predetermined order whenever one gain is set by the gain setting means;
receiving determination means which whenever one direction is set by the direction setting means, sets the smart antenna to one direction set by the direction setting means, sets the smart antenna to one gain set by the gain setting means, and determines if the television broadcast can be received via the receiving means; and
possible channel record means which when a television broadcast reception is determined possible by the receiving determination means, records the identification information on one channel set by the channel setting means relating the identification information to one gain set by the gain setting means and to one direction set by the direction setting means,
wherein the number count means counts, for each one of the first predetermined number of directions and for each one of the second predetermined number of steps of gains, the number of ready-to-receive channels given by the channel identification information stored in the receiving channel storage means when the receiving determination means ends all of the determinations on a possible television broadcast reception for all of the plurality of channels.

6. The broadcast receiving apparatus according to claim 5, wherein the receiving determination means determines whether or not the television broadcast reception is possible based on a BER (bit error rate) of a television broadcast signal received via the receiving means.

7. The broadcast receiving apparatus according to claim 1, further comprising:
receiving channel storage means for storing channel identification information which identifies ready-to-receive channels relating the channel identification information to each one of the first predetermined number of directions and to each one of the second predetermined number steps of gains;
forcible setting means which makes the channel setting means select one channel from the plurality of channels and set it in succession;
direction setting means which selects one direction from the first predetermined number of directions and sets it in a predetermined order whenever one channel is set by the forcible setting means via the channel setting means;
gain setting means which selects one gain from the second predetermined number of steps of gains and sets it in a predetermined order whenever one direction is set by the direction setting means;
receiving determination means which whenever one gain is set by the gain setting means, sets the smart antenna to one direction set by the direction setting means, sets the smart antenna to one gain set by the gain setting means, and determines if the television broadcast received via the receiving means can be received; and
possible channel record means which when a television broadcast reception is determined possible by the receiving determination means, records the identification information on one channel set by the channel setting means relating the identification information to one gain set by the gain setting means and to one direction set by the direction setting means,
wherein the number count means counts, for each one of the first predetermined number of directions and for each one of the second predetermined number of steps of gains, the number of ready-to-receive channels given by the channel identification information stored in the receiving channel storage means when the receiving determination means ends all of the determinations on a possible television broadcast reception for all of the plurality of channels.

8. The broadcast receiving apparatus according to claim 7, wherein
the receiving determination means determines whether or not the television broadcast reception is possible based on a BER (bit error rate) of a television broadcast signal received via the receiving means.

9. The broadcast receiving apparatus according to claim 1, further comprising:
receiving channel storage means for storing channel identification information which identifies ready-to-receive channels relating the channel identification information to each one of the first predetermined number of directions and to each one of the second predetermined number steps of gains;
forcible setting means which makes the channel setting means select one channel from the plurality of channels and set it in succession;
gain setting means which selects one direction from the second predetermined number of gains and sets it in a predetermined order whenever one channel is set by the forcible setting means via the channel setting means;
direction setting means which selects one direction from the first predetermined number of directions and sets it in a predetermined order whenever one gain is set by the gain setting means;
receiving determination means which whenever one direction is set by the direction setting means, sets the smart antenna to one direction set by the direction setting means, sets the smart antenna to one gain set by the gain setting means, and determines if the television broadcast can be received via the receiving means; and
possible channel record means which when a television broadcast reception is determined possible by the receiving determination means, records the identification information on one channel set by the channel setting means relating the identification information to one gain set by the gain setting means and to one direction set by the direction setting means,
wherein the number count means counts, for each one of the first predetermined number of directions and for each one of the second predetermined number of steps of gains, the number of ready-to-receive channels given by the channel identification information stored in the receiving channel storage means when the receiving determination means ends all of the determinations on a possible television broadcast reception for all of the plurality of channels.

10. The broadcast receiving apparatus according to claim 9, wherein the receiving determination means determines whether or not the television broadcast reception is possible based on a BER (bit error rate) of a television broadcast signal received via the receiving means.

* * * * *